US010045357B2

(12) United States Patent
Wilhelmsson et al.

(10) Patent No.: US 10,045,357 B2
(45) Date of Patent: Aug. 7, 2018

(54) INTERFERENCE MANAGEMENT FOR NETWORK ASSISTED DEVICE-TO-DEVICE COMMUNICATION

(75) Inventors: Leif Wilhelmsson, Dalby (SE); Gabor Fodor, Hasselby (SE); Bengt Lindoff, Bjarred (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/400,681

(22) PCT Filed: Jun. 13, 2012

(86) PCT No.: PCT/EP2012/061153
§ 371 (c)(1),
(2), (4) Date: Feb. 21, 2015

(87) PCT Pub. No.: WO2013/170908
PCT Pub. Date: Nov. 21, 2013

(65) Prior Publication Data
US 2015/0223257 A1    Aug. 6, 2015

Related U.S. Application Data

(60) Provisional application No. 61/646,976, filed on May 15, 2012.

(51) Int. Cl.
*H04W 72/00* (2009.01)
*H04W 72/08* (2009.01)
(Continued)

(52) U.S. Cl.
CPC ......... *H04W 72/082* (2013.01); *H04W 24/02* (2013.01); *H04W 72/0406* (2013.01); *H04W 76/14* (2018.02)

(58) Field of Classification Search
CPC .................................................. H04W 72/0406
See application file for complete search history.

(56) References Cited

U.S. PATENT DOCUMENTS

2009/0325625 A1* 12/2009 Hugl ..................... H04W 52/16
455/522
2009/0327391 A1* 12/2009 Park ...................... H04W 8/005
709/201

(Continued)

FOREIGN PATENT DOCUMENTS

CN    102365897 A    2/2012
JP    2009177817 A    8/2009

(Continued)

OTHER PUBLICATIONS

PCT International Search Report, dated Jan. 25, 2013, in connection with International Application No. PCT/EP2012/061153, all pages.

(Continued)

*Primary Examiner* — Fabricio R Murillo Garcia
(74) *Attorney, Agent, or Firm* — Leffler Intellectual Property Law, PLLC

(57) ABSTRACT

A method of a first wireless communication device adapted to perform device-to-device communication with a third device is disclosed, wherein a second device causes interference to the device-to-device communication. The method comprises determining an interference criterion associated with the second wireless communication device, and transmitting an interference management request message related to the interference criterion to a network node. A corresponding method of a network node adapted to provide assistance of device-to-device communication is also disclosed. The method comprises receiving the interference management request message related to the interference criterion from the first wireless communication device, and transmitting an interference control message to at least one (Continued)

of the first wireless communication device, the second wireless communication device, and the third wireless communication device. Corresponding computer program product, arrangements, wireless communication device and network node are also disclosed.

15 Claims, 5 Drawing Sheets

(51) Int. Cl.
*H04W 24/02* (2009.01)
*H04W 72/04* (2009.01)
*H04W 76/14* (2018.01)

(56) References Cited

U.S. PATENT DOCUMENTS

| | | | |
|---|---|---|---|
| 2011/0258313 A1* | 10/2011 | Mallik | H04W 8/005 709/224 |
| 2011/0276412 A1* | 11/2011 | Mgrdechian | G06Q 30/0207 705/14.66 |
| 2011/0306347 A1 | 12/2011 | Choi et al. | |
| 2012/0044815 A1* | 2/2012 | Geirhofer | H04W 72/082 370/248 |
| 2012/0079019 A1* | 3/2012 | Miettinen | G06Q 50/00 709/204 |

FOREIGN PATENT DOCUMENTS

| | | |
|---|---|---|
| RU | 2351086 C2 | 3/2009 |
| WO | 2005053253 A2 | 6/2005 |
| WO | 2010109303 A2 | 9/2010 |
| WO | 2011050519 A1 | 5/2011 |
| WO | 102308610 A | 1/2012 |
| WO | 2012/015698 A1 | 2/2012 |

OTHER PUBLICATIONS

PCT Written Opinion, dated Jan. 25, 2013, in connection with International Application No. PCT/EP2012/061153, all pages.

Fodor, Gabor et al. "Design aspects of network assisted device-to-device communications" IEEE Communications Magazine, IEEE Service Center, Piscataway, US, vol. 50, No. 3, Mar. 1, 2012, pp. 170-177, XP011429640, ISSN: 0163-6804.

Japanese Office Action dated Mar. 14, 2016 in connection with Japanese Application No. 2015-511938, 3 pages.

English language translation of Japanese Office Action dated Mar. 14, 2016 in connection with Japanese Application No. 2015-511938, 3 pages.

Russian Office Action, dated Apr. 20, 2016, in connection with Russian Application No. 2014150598, all pages.

English translation of Russian Office Action, dated Apr. 20, 2016, in connection with Russian Application No. 2014150598, all pages.

English translation of Russian Search Report, dated Apr. 20, 2016, in connection with Russian Application No. 2014150598, all pages.

Chinese Office Action dated Jul. 31, 2017 in connection with Chinese Application No. 201280074736.2, 8 pages.

English language translation of Chinese Office Action Summary dated Jul. 31, 2017 in connection with Chinese Application No. 201280074736.2, 3 pages.

Chinese Search Report dated Jul. 31, 2017 in connection with Chinese Application No. 201280074736.2, 2 pages.

\* cited by examiner

INTERFERENCE MANAGEMENT FOR NETWORK ASSISTED DEVICE-TO-DEVICE COMMUNICATION

CROSS-REFERENCE TO RELATED APPLICATIONS

This application claims the benefit of U.S. Provisional Application No. 61/646,976, filed May 15, 2012, which is hereby incorporated herein by reference in its entirety.

TECHNICAL FIELD

The present invention relates generally to the field of network assisted device to device communication. More particularly, it relates to interference management of such communication.

BACKGROUND

Device-to-Device (D2D) communication refers to direct communication between devices. In D2D communication data to be transmitted from a first device to a second device is typically not relayed via any cellular network. Some examples of D2D communication of the prior art are Bluetooth communication, FlashlinQ communication, and WLAN (e.g. IEEE 802.11) communication (e.g. WIFI direct).

Device-to-device communication may be applicable in various scenarios. One scenario is when a cellular radio access network is present, and able to set up a cellular connection between two devices. D2D communication may be a complement to the cellular communication in such scenarios.

There may be situations when D2D communication provides better performance (better signal quality, higher bit rate, lower latency, etc) than cellular communication. This may be due to proximity between the devices and/or specific signaling gain of the D2D protocol (e.g. hop gain).

In some situations, the network may have constraints (e.g. due to being heavily loaded) resulting in that a service cannot be provided at all using a network connection. Then, D2D communication would be an alternative.

There may also be situations when D2D communication may be preferred by the user of a device (e.g. due to billing costs).

D2D communication may improve spectrum efficiency and reduce the network load for the cellular network, especially in the case the D2D connection uses another spectrum range (e.g. an unlicensed spectrum) than the cellular network (typically licensed spectrum). Furthermore, since cellular communication uses an uplink-downlink pair for each of the two devices while a D2D connection would only use one link pair, spectrum efficiency is improved even if the D2D connection would use cellular spectrum resources. This would be true even for network assisted D2D communication where most of the data would be transmitted over the D2D connection and only a small amount of information is to be transmitted over the network link.

D2D communication may be ad hoc or may be network assisted. For example, a cellular network may assist a D2D connection by establishing security of the D2D link and/or partly or fully controlling the setup of the D2D connection (e.g. device/peer discovery and resource allocation). A cellular network may also assist D2D communication by controlling the interference environment. For example, if using licensed operator's spectrum for the D2D communication, higher reliability can be provided than when operating in unlicensed spectrum. To assist the D2D connection, the network may also provide synchronization and/or partial or full Radio Resource Management (RRM).

Device/peer discovery in D2D communication is typically based on the devices transmitting (e.g. broadcasting) and/or detecting beacon signals respectively. In network assisted D2D device discovery, the network may assist the devices by allocating beacon resources and providing information that the devices can use to construct and detect the beacon signals used for the discovery.

Typically, a beacon signal for a device could be based on the identity of the device, or could be randomly drawn from a set of beacon signals. This applies both if the network allocates the beacons and if the beacons are not provided by the network (e.g. after the discovery phase—in a connected/connection state—a device may draw a beacon randomly and communicate beacon information to other devices).

The beacon signals are then transmitted by the respective (master) devices (typically at certain time intervals). The listening (slave) devices then need to scan for beacons. It should be noted that a device may take the role of master only, slave only or a combination of both roles. When a beacon is detected, the corresponding slave typically sends an acknowledgement to the corresponding master, and a D2D connection can be initiated.

Having the beacon signaling allocated and coordinated by a network reduces the beacon collision risk. Furthermore, letting the slaves have beacon information of the master(s) might improve scanning performance (e.g. shorter time to discovery, lower power consumption).

In network assisted D2D communication, the network may also assist the devices by allocating communication resources and providing information that the devices can use to optimize the communication.

In D2D communication scenarios, it is envisioned that there may be a large amount of D2D capable devices in vicinity to one another, e.g. in the area covered by a particular network node or in a smaller region. This allows for many possibilities for D2D link establishment, but the situation may also cause quite some interference generated by the D2D signaling, e.g. peer discovery and other signaling. Optimizing e.g. link performance and system performance in such scenarios is a complex task.

Without involvement of the network, the system may typically stand a high risk of becoming interference limited. Thus, the potential of using D2D communication to significantly increase the total traffic per area might not at all be as high as expected. In addition, when too many devices are within the same area, there might be severe congestion, thus limiting the possibility to provide acceptable quality of service.

"Design Aspects of Network Assisted Device-to-Device Communications", IEEE Communications Magazine, March 2012, pp. 170-177 by Fodor et al. discloses peer discovery methods, physical layer procedures and radio resource management algorithms for device-to-device communications underlaying a cellular infrastructure. The network can mediate in the discovery process by recognizing D2D candidates, coordinating the time and frequency allocations for sending/scanning for beacons and thereby making the pairing process more energy efficient and less time consuming. Furthermore, the eNB can assign client-server roles to the UEs, including the case when both UEs transmit and receive known demodulation reference signals (DMRSs) for channel quality estimation. The D2D DMRS parameters are communicated to both UEs of the D2D pair, and DMRS measurements can then be reported to the eNB to facilitate mode selection, power control and other RRM functions controlled by the eNB.

There is a need for alternative approaches to network assisted device-to-device communication. In particular, there is a need for efficient interference management approaches in network assisted device-to-device communication.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object to provide interference management approaches for network assisted device-to-device communication. In particular, it is an object to provide efficient interference management approaches for network assisted device-to-device communication.

Embodiments as described herein may be used in various scenarios. For example, some embodiments may be used in a D2D peer discovery phase, in a D2D connection setup phase, and/or in an ongoing D2D communication phase.

Embodiments address the problem of interference management in D2D communication scenarios. As described herein, the network ensures that interference control is based on accurate information from the different devices according to some embodiments. This has the advantage that unnecessarily hard restrictions on the D2D communications may be avoided and/or that an uncontrolled interference situation (e.g. with escalating interference) may be avoided.

Some embodiments comprise a method of a first wireless communication device adapted to perform device-to-device communication. The method comprises determining an interference criterion and/or interference situation associated with a second wireless communication device, and transmitting an interference management request message related to the interference criterion and/or situation to a network node.

Some embodiments comprise a method of a network node adapted to provide assistance of device-to-device communication. The method comprises receiving, from a first wireless communication device adapted to perform device-to-device communication, an interference management request message related to an interference criterion and/or situation, and transmitting an interference control message to at least one of the first wireless communication device, a second wireless communication device, and a third wireless communication device.

The first device may be involved in (or setting up) D2D communication with the third device and the second device may cause interference to that communication.

The interference criterion and/or interference situation may comprise one or more of a maximum transmission power for the second device, a maximum reception power of the first device for reception of transmissions of the second device, a desired power adjustment (e.g. lower by a number of dB, lower one power control unit, etc.), for example. This may be determined autonomously by the interfered, first device (e.g. by determining how high interference power it can tolerate), or aided by the interfering, second device and/or the network node.

For example, the method of the first device may comprise transmitting, to the network node, a request for second device test signaling (e.g. beacon signaling or other relevant sounding signal, preferably with known transmission power), and determining the interference situation and/or criterion based on a reception of the second device test signaling. The method may further comprise receiving second device test signaling information from the network node. Thus, the interference management may be initiated by the first device.

The method of the network node may comprise receiving a request for a second device test signaling from the first device and transmitting a test signaling command to the second device. The method may also comprise allocating test signaling resources to the second device and transmitting second device test signaling information (comprising allocation information) to the first device. The test signaling command to the second device may comprise allocation information.

In some embodiments, the interference management may be initiated by the network node. For example, the method of the network node may comprise transmitting a test signaling command to the second device and transmitting second device test signaling information to the first device. The method may also comprise allocating test signaling resources to the second device. The test signaling command to the second device and second device test signaling information to the first device may comprise allocation information.

The method of the first device may comprise receiving second device test signaling information from the network node and determining the interference situation and/or criterion based on a reception of the second device test signaling.

The interference control message transmitted by the network node may comprise transmission adjustment instructions to at least one of the first, second and third device. The transmission adjustment instructions may comprise instructions to adjust the transmission power. The transmission adjustment instructions may comprise instructions to adjust the transmission pattern (i.e. what time resources are used for transmission). The transmission adjustment instructions may comprise instructions to adjust the transmission frequency (e.g. which carrier frequency should be used). The transmission adjustment instructions may comprise instructions to adjust transmission resources (e.g. time/frequency allocation for OFDM signaling). The transmission adjustment instructions may comprise instructions to adjust a transmission data rate.

In some embodiments, the interference control message transmitted by the network node may also comprise reception adjustment instructions to at least one of the first, second and third device. For example, if the network instructs the third device to change its transmission frequency, the first device must be informed so it can adjust its reception frequency accordingly.

Thus, some embodiments comprise a method for determining an experienced interference level at a first device caused by a second device. If the experienced interference level is determined to be too high (e.g. exceeding a threshold) the method comprises attempting to reduce it. The method comprises the first device (which has determined the interference level) sending information to the network (e.g. a network node) requesting the network to take action in order to reduce the interference. The network may react accordingly in one or more of various ways.

The network may determine if it is possible for the second device (i.e. the interfering device) to reduce its transmission power. The network may request the interfering device to reduce its transmission power based on the information from the first device.

The network may request the first device to modify the TX/RX (transmission/reception) pattern. This may be done in order to reduce the impact of interference from other D2D links. The network may provide information about how to modify the TX/RX pattern.

The network may request the second device to modify the TX/RX pattern. This may be done in order to reduce the impact of interference to other D2D links. The network may provide information about how to modify the TX/RX pattern.

In some embodiments, the interference determination is initiated by the first device. In some embodiments, the interference determination is initiated by the network. For example, the method may comprise the network requesting the second device to send a signal and the first device to listen for the same signal. This may be done in order to determine the level of the interference caused by a second device.

Some embodiments comprise an arrangement of a first wireless communication device adapted to perform device-to-device communication. The arrangement comprises an interference determiner adapted to determine an interference criterion and/or situation associated with a second wireless communication device, and a transmitter adapted to transmit an interference management request message related to the interference criterion and/or situation to a network node. The arrangement may also comprise a receiver adapted to receive signals and information as exemplified above.

Some embodiments comprise a wireless communication device adapted to perform device-to-device communication and comprising the above arrangement.

Some embodiments comprise an arrangement of a network node adapted to provide assistance of device-to-device communication. The arrangement comprises a receiver adapted to receive an interference management request message related to an interference criterion from a first wireless communication device adapted to perform device-to-device communication. The arrangement also comprises a transmitter adapted to transmit an interference control message to at least one of the first wireless communication device, a second wireless communication device, and a third wireless communication device. The arrangement may also comprise an allocator adapted to allocate test signal resources to the second device.

Some embodiments comprise a network node adapted to provide assistance of device-to-device communication and comprising the above arrangement.

Some embodiments comprise a computer program product comprising a computer readable medium, having thereon a computer program comprising program instructions, the computer program being loadable into a data-processing unit and adapted to cause execution of the method according to any of the examples herein when the computer program is run by the data-processing unit.

An advantage of some embodiments is that an effective way to perform interference management in D2D communication is provided. For example, when the interference management is initiated by the interfered device, no resources are wasted by interference measurements for devices that are not adversely affected by any interference. The same applies in situations when the interference management is initiated by the network node based on signal quality information from one or more devices.

Another advantage of some embodiments is that interference may be kept down (e.g. at a low enough level) without unnecessarily limiting the transmission possibilities for D2D communication. For example, since the interference criterion is determined by the interfered device, a corresponding adaptation of the communication of the interfering device may be tailored to the interference criterion. Thus, if the adaptation is in terms of lowering the transmission power, the transmission power may be lowered as much as needed to avoid interfering but not more (hence, maximizing the D2D communication quality of the interfering device under the conditions given by the interfered device).

Yet a further advantage of some embodiments is that the radio conditions applicable for D2D communication may be estimated in an efficient way.

Another advantage of some embodiments is that a spectrum efficient way to determine the interference for network assisted D2D communication is provided.

BRIEF DESCRIPTION OF THE DRAWINGS

Further objects, features and advantages will appear from the following detailed description of embodiments, with reference being made to the accompanying drawings, in which.

DETAILED DESCRIPTION

Figure 1A:
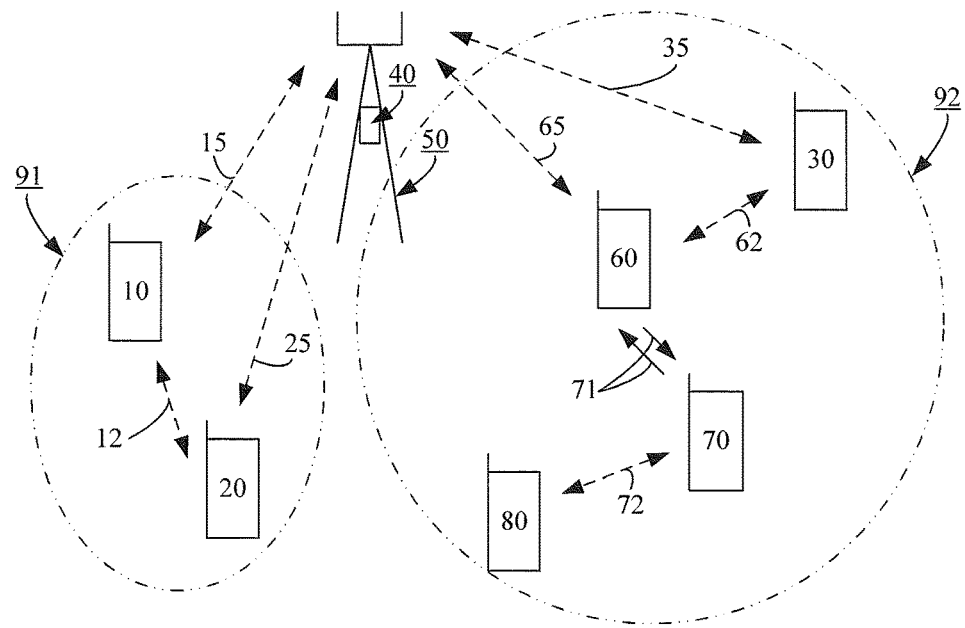
FIGS. 1a and 1b are schematic drawings illustrating devices in a network according to some embodiments.

It is noted that D2D protocols/communication/connection when used herein relates to any known or future suitable D2D application. Examples include, but are not limited to, Bluetooth, WLAN (WIFI direct), FlashlinQ, and D2D using cellular spectrum. For example, a network assisted D2D communication may use uplink and/or downlink resources of the cellular spectrum as allocated by the network node. Alternatively, the network assisted D2D communication may use unlicensed spectrum, such as the ISM band at 2.45 GHz. The D2D communication may be TDD or FDD. The network node may impose restrictions on the D2D communication (particularly when cellular and/or licensed spectrum is used), e.g. power control such as a maximum allowed transmission power and/or power control commands.

Similarly, it is noted that cellular protocols/communication/connection when used herein relates to any known or future suitable cellular application. Examples include, but are not limited to, 3GPP cellular standards (e.g. GSM, WCDMA, TD-SCDMA, LTE), WLAN, and even device-to-device networks.

A network node may, for example, comprise a base station, a NodeB, an eNodeB, or a WLAN access point, and a network may comprise a corresponding collection of network nodes and other network parts.

A network node may be any suitable part of a network (e.g. a serving or controlling node), e.g. a cellular base station, a relay node, a wireless access point, or a core network node.

The introduction of network assisted D2D communications allows for interference coordination. This may typically require that the network, and perhaps also the devices engaged in D2D communications, have knowledge of the interference situation. Knowledge of the signal-to-interference ratio (even that being a complex task to acquire) typically does not suffice to determine if interference is a problem or not in a particular situation. Whether interference is a problem or not typically also depends on other aspects, such as, for example, the currently supported data rate in a D2D link and the probability of interference. Thus, providing an efficient and accurate approach to interference estimation and interference control is an object of embodiments presented herein.

In the following, embodiments will be described where approaches to interference management in network assisted device-to-device communication are taken.

For example, network assisted D2D link estimation may be provided according to some approaches. This may be beneficial for centralized interference coordination, for example. Centralized (i.e. network assisted) interference coordination of D2D communication typically requires that the network node (and possibly also the devices) is at least partly aware of the applicable interference situation (or more generally the applicable radio conditions).

Some embodiments propose to involve the network in controlling different transmit parameters of different links used for D2D communications. The transmit parameters may comprise, for example, data rate, transmit power, time, and/or frequency. The interference control may (at least partly) be based on measurements performed by one or more of the D2D capable devices. The measurements may be requested by one or more of the devices and assisted by the network, or the measurements may be initiated by the network. In both cases the network may take certain actions based on the performed measurements. In some embodiments, the measurements are initiated and performed by one or more of the D2D capable devices autonomously, and then the network may take certain actions based on the performed measurements.

FIG. 1a is a schematic drawing illustrating devices 10, 20, 30, 60, 70, 80 in a network comprising a base station site 50 with a base station (network node) 40. The network node 40 is connected to each of the devices 10, 20, 30, 60, 70, 80 via respective wireless links 15, 25, 35, 65 (all links not shown in the figure). The devices have D2D capability. In addition, there may be devices (not shown) which are not D2D capable.

Since the devices 10 and 20 are geographically close to each other the radio conditions for direct communication between them are very good in this example. Hence, the network node has assisted (via links 15 and 25) them to set up a D2D wireless link 12. Similarly, devices 30 and 60 are connected via D2D link 62 and devices 70 and 80 are connected via D2D link 72.

Also shown is a potential interference situation, illustrated by 71, between devices 60 and 70. Devices 10 and 20 may be seen as one group 91 where the devices are relevant to each other (in this case for a prospect D2D connection via link 12), and devices 30, 60, 70 and 80 may be seen as one other group 92 where the devices are relevant to each other (in this case for prospect D2D connections via links 62 and/or 72, but also in terms of the interference 71).

The communication might be based on either FDD or TDD. Furthermore, the network node (or another unit in the network) may be in control of allocating time/frequency resources to terminals for UL/DL communication as well as resources for potential D2D communication (which could, for example, be resource blocks or similar in case the cellular system is operating according to the 3GPP LTE standard). The network node can also control the transmit power in the D2D communication, so that it does not interfere with the ordinary (cellular) traffic (for instance between devices and the network node).

Figure 1B:
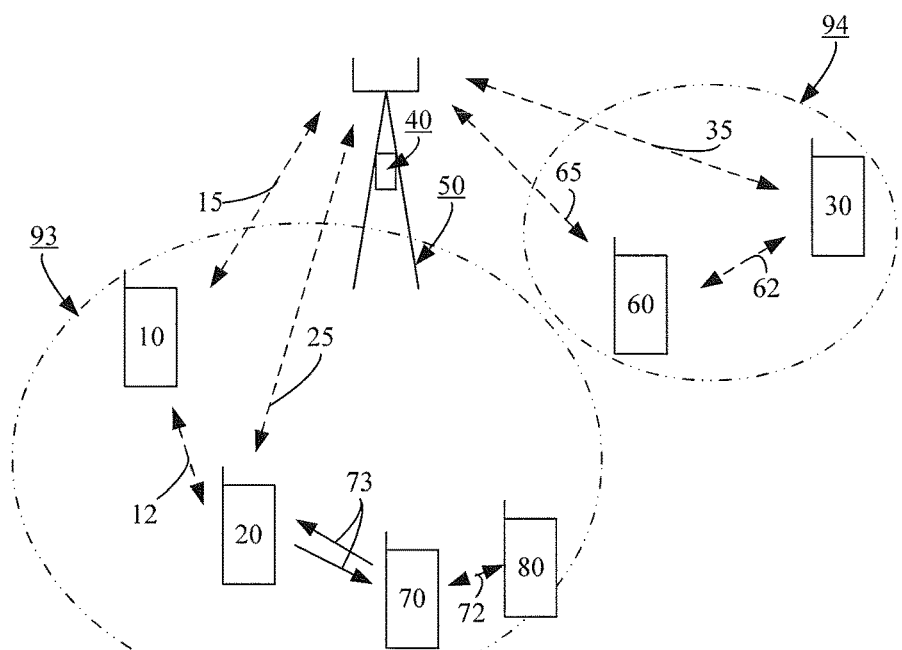

FIG. 1b is a schematic drawing illustrating devices 10, 20, 30, 60, 70, 80 in a network comprising a base station site 50 with a base station (network node) 40. FIG. 1b illustrates a situation at a later moment in time compared to FIG. 1a. In FIG. 1b, the device 70 has moved and is now in another location. The devices 70 and 80 are still connected via D2D link 72. However, device 70 is now far from device 60 and the interference situation experienced in FIG. 1a has changed. Instead, there is now a potential interference situation, illustrated by 73, between devices 20 and 70. Thus, devices 10, 20, 70 and 80 may now be seen as one group 93 where the devices are relevant to each other, and devices 30 and 60 may be seen as one other group 94 where the devices are relevant to each other.

Hence, suppose that four D2D capable devices (30, 60, 70, 80) are connected to the base station (40) as shown in FIG. 1a. Moreover, suppose that devices 60 and 70 might cause interference to one another.

According to some embodiments, the devices 60 and/or 70 of FIG. 1a (and correspondingly the devices 70 and/or 20 of FIG. 1b) determines a criterion for the experienced interference and thereafter transmits an interference management request message to the network node 40 based on the determined interference criterion. Then, the network node may instruct the interfering device to adapt accordingly.

For example, the criterion may comprise an indication of a maximum acceptable interference power at the receiver of the respective device and the interference management request message may comprise an indication to lower the transmission power of an interfering device if the received interference power exceeds the maximum acceptable interference power.

This process may be initiated by the network node or by the respective device when interference is suspected or detected.

In some embodiments, the network node may allocate test signal resources to interfering devices and transmit information regarding the allocation to the interfering devices and to the interfered devices. Then the interfering devices transmit test signals accordingly. The interfered devices monitor the test signals and determine the interference criterion based on measurements performed on the received test signals.

The process in the network node may be initiated by the network node or by the respective device when interference is suspected or detected.

In some embodiments, the path loss between the devices 60 and 70 may be needed to determine the adjustment of the interfering device from the determined criterion. For example, if the determined criterion comprises a maximum acceptable interference power at the receiver of the interfered device, the path loss is needed to determine a maximum acceptable transmission power of the interfering device.

The path loss between different devices may or may not be known (to the network and/or to the respective devices). For example, the path loss may be estimated by performing (at least parts of) the following method (typically before D2D connection setup) as illustrated in FIG. 2.

Figure 2:
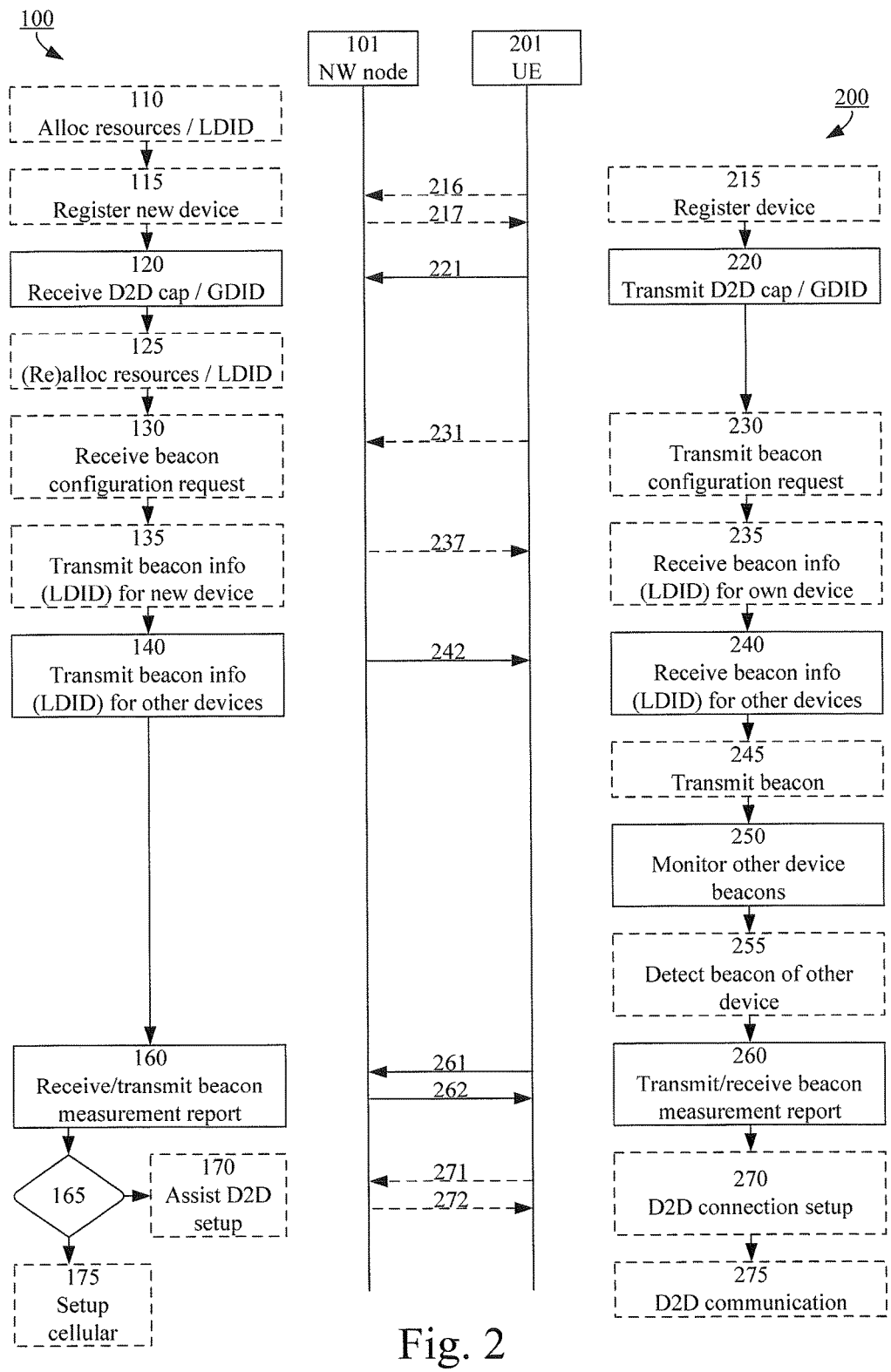
FIG. 2 is a combined flowchart and signaling diagram illustrating example methods and signaling according to some embodiments.

FIG. 2 is a combined flowchart and signaling diagram illustrating example methods 100 and 200 performed by a network node 101 (e.g. the network node 40 of FIGS. 1a and 1b) and a D2D capable device (UE) 201 (e.g. one or more of the devices 60 and 70 of FIG. 1a and/or one or more of the devices 70 and 20 of FIG. 1b) respectively, and signaling between them according to some embodiments.

In network assisted D2D communications, the network can assist devices in the device (peer) discovery process. Device discovery is typically based on transmitting (e.g. broadcasting) and detecting beacon signals. In network assisted device discovery, the network can assist the devices by allocating resources and providing information that devices can use to construct and detect the beacon signals used for the discovery.

Thus, a beacon or beacon signal may be a signal broadcast from a device (e.g. a wireless communication device) making it possible for other devices to note the presence of the device. It may have fixed or variable transmission power. It may typically be used for peer discovery in D2D communication scenarios as mentioned above, but may also be applicable in other scenarios (e.g. interference measurement). In some applications, a beacon may be referred to as a type of reference signal or synchronization signal.

The beacon transmission may take place in an un-licensed spectrum or in a licensed spectrum. Similarly the D2D communication may take place in an un-licensed spectrum or in a licensed spectrum, not necessarily depending on which spectrum was used for the beacon transmission.

FIG. 2 illustrates one possible approach that may be applied in a peer discovery process. It involves structured allocation of beacons and may produce path loss information as one measurement result.

If there are already other D2D capable devices registered to the network node, the network node has allocated beacon resources to them in 110 as shown in FIG. 2. The allocation (and/or re-allocation) of 110 and 125 (later described) may be performed in a resource efficient way. Some embodiments providing resource efficient allocation will now be described before carrying on the description of FIG. 2.

In some embodiments, it may be beneficial to minimize the total number of beacon transmissions. For example, beacon transmission may be allowed only by one device at a time and the other devices are asked to listen. Thus, beacon transmission allocation may first allow a first device to transmit, then a second device, then a third device, and so on.

This approach may be taken towards all D2D capable devices registered at the network node, or towards a group of D2D capable devices registered at the network node (e.g. a group of devices being close to each other, in a same geographical region, or otherwise likely to be able to set up D2D communication). In the latter case, beacon transmission allocation may, thus, first allow a first device of a first group and a first device of a second group to transmit simultaneously, then a second device of the respective groups, and so on. In such an example, the devices of the first group are asked to listen only for the beacons transmitted in relation to the first group and similarly for the devices of the second group.

This approach provides the advantage of having a structured beacon transmission scheme, which minimizes the number of beacons transmitted in the cell/region. The risk of interference between beacons is also minimized as well as the interference generation by beacons towards other signaling of the cell. This is achieved while not compromising the amount of information that it is possible to extract via the beacon process.

In some embodiments, it may be beneficial to minimize the total number of beacon transmissions and/or the total amount of beacon monitoring. For such a purpose it is noted that the conditions of a signal path from a first device to a second device is probably equal or at least similar to the conditions of the signal path in the opposite direction (at least if a similar frequency band is used for communication in both directions, e.g. TDD, but also possibly feasible for FDD since the average link attenuation is typically highly correlated also for FDD). Thus, to detect D2D communication prospects and/or to estimate signaling conditions of a prospect D2D link, it may be sufficient to let only one of the two devices transmit a beacon and let the other listen.

Following this principle, the allocation of beacon resources (to all D2D capable devices registered at the network node, or towards a group of devices) may be adjusted by not activating a device for listening purposes once it has transmitted its allocated beacon. Thus, beacon transmission allocation may first allow a first device to transmit and ask the other devices to listen, then a second device is allowed to transmit and the other devices (except the first device) are asked to listen, then a third device is allowed to transmit and the other devices (except the first and second device) are asked to listen, and so on.

This approach has the further advantage of minimizing the average beacon listening time of a device and, hence, power consumption.

In some embodiments, a beacon transmission resource may be allocated only to one or more devices that have changed its location (compare with device 70 of FIGS. 1a and 1b). Such a location change may, for example comprise entering of a cell, but it may also or alternatively comprise movement of the device within a cell (e.g. detected by positioning equipment of the device such as a GPS). Thus, when a device has moved it may be allocated a beacon transmission resource by the network node, who may also ask the other devices to listen accordingly. The network may ask all D2D capable devices in a cell to listen. Alternatively, it may ask only the devices of a group as described above to listen. The group may be a group that the device belonged to according to a previous location and/or a group that the device belongs to according to a current location. For example, only the group the device previously belonged to may be asked to listen if a small movement is detected, while a new group (or all devices) may be asked to listen if a large movement or cell change is detected. In some embodiments devices that have not moved are not allocated any beacon transmission resources.

A location change of a device may be detected autonomously by the network node (e.g. for a cell change) or may be detected by the network node via signaling from the device to the network node (e.g. a GPS of the device detecting movement within a cell). Another way of detecting a possible location change may comprise evaluating whether the corresponding radio links have changed.

Some embodiments use a short and therefore efficient local device identity (LDID) as a bearer of beacon information. This local device identity is allocated in a network node to a corresponding global device identity (GDID) conveyed by a device to the network node.

Each GDID may be associated with a device per se or with one (possibly out of several) subscription used by the device. Even further, a device (or subscription) may be associated with different GDIDs for different services (offered or requested by the device), for example. One example is to use IMSI as a GDID. An example of several GDIDs for a single device could be a vending machine selling several beverages, each having its own GDID. A GDID could be a combination of, for example, a subscription specific and service specific ID. The GDIDs are typically associated with the devices independently of the location or current tracking area or cell association of that device.

The set of possible LDIDs kept at a network node may be designed to minimize a mutual cross correlation or maximize a signal distance between the corresponding beacons. The subset of LDIDs used at a particular moment may also be chosen with such conditions in mind. The size of a subset of LDIDs used at a particular moment may, for example, depend on a current number of D2D capable devices in a cell or on a current number of D2D active devices in the cell. Thus, the number and/or the characteristics of the local device identities used by the network node for D2D communication in a cell may be determined by using one or more criteria. Example criteria include, but are not limited to, a current number of D2D capable devices operating in the cell, a correlation characteristic of the LDIDs, a total number of available LDIDs, LDIDs used by neighboring network nodes, etc.

Turning again to FIG. 2, a new device (UE 201) commences registration to the network node 101 in 215, e.g. by transmission of a registration request message 216, and the network node 101 registers the new device 201 in 115, e.g. by transmission of a registration response message 217. The registering of the new device are presented as optional in this example, since the subsequent actions may take place even if the new device is already registered to the network node.

In 220, the device 201 transmits a D2D capability indication (e.g. a D2D access request) to the network node 101 who receives the indication in 120. The D2D capability indication may be transmitted via the message 221 as illustrated in FIG. 2. Alternatively, 220 and 120 may be part of the registration procedure 215, 115, in which case the D2D capability indication may be comprised in the registration request message 216. The D2D capability indication may comprise one or more global device identities associated with the device 201.

In 125, the network node 101 allocates beacon resources to the device 201 in a similar way as was described in relation to 110. If applicable, the network node 101 may also re-allocate already allocated resources of other devices based on the new conditions in 125.

A beacon configuration request message 231 may optionally be transmitted in 230 by the device 201 and received in 130 by the network node 101.

Either as a response to a beacon configuration request message 231 or autonomously, the network node 101 may transmit information regarding the allocated beacon resources for the device 201 in 135 using message 237. Similarly, either as a response to the beacon configuration request message 231 or autonomously, the network node 101 transmits information regarding the allocated beacon resources for other devices in 140 using message 242. In some embodiments, the network node may receive information regarding the allocated beacon resources for neighboring network nodes.

In such embodiments, the transmission of beacon information in 135 and 140 may further comprise transmitting information regarding the allocated beacon resources for devices in the cell of network node 101 to neighboring network nodes using either one or more of the messages 237 and 242 or a separate message (not shown).

The transmission of beacon information in 140 may even further comprise transmitting information regarding the allocated beacon resources for devices in other, neighboring, cells using message 242.

The transmissions in 135 and 140 may be joint transmissions to the device 201 and other devices (e.g. broadcasting the information or using a shared channel). Alternatively or additionally, the transmissions in 135 and 140 may comprise separate transmissions to the device 201 and other devices respectively (e.g. using dedicated signaling).

The information regarding the allocated beacon resources may be used to determine how to transmit and/or receive (or detect) a beacon signal.

The information regarding the allocated beacon resources of the transmissions 237, 242 may e.g. comprise a local device identity, a beacon signature, a beacon signal shape, a beacon signature, a beacon signal pattern (e.g. a pattern in time and/or frequency where the beacon signal shape/signature should be used and/or a definition of how the beacon signal shape/signature should be repeated), and/or a beacon transmission power (minimum/actual/maximum). The beacon transmission power could comprise one or more of a maximum allowed transmission power, a minimum allowed transmission power, an allowed transmission power range, and a transmission power variation scheme (e.g. with different transmission power for different time/frequency resources).

In some embodiments, the actions in 125 may be part of the registration procedure 215, 115 and part (e.g. LDID) or all of the information of 237 and 242 may be included in a registration response message 217.

The transmission of allocation information regarding other devices in 140 may be based on which devices have a good prospect of D2D communication with the new device 201 (e.g. have similar D2D capabilities, are in a geographical vicinity, have good radio conditions of a prospect D2D link, etc). Such information may be stored for each device together with the beacon allocation information in the network node (or any other suitable entity of the network).

In 235, the device 201 receives the information regarding its own allocated beacon resources, and uses the information to transmit its beacon in 245. The beacon transmission may be done using any suitable known or future method. For example, a beacon signature may be mapped to a modulation (according to an applicable standard) and transmitted. The transmission pattern may be the time/frequency resources to be used for transmission of the signature. Such resources could be a single instance or according to a repetition pattern. The pattern could be regular or irregular in time domain, and could also be shifted in frequency in a regular or irregular manner. The frequency shift could be in between two transmission instances of the pattern, but could also be a frequency shift of resources in a specific beacon transmission session. The transmission pattern may further include a start time and a stop time for the pattern. The beacon transmission may, for example, be stopped if a stop condition is fulfilled, if an end of transmission pattern is reached, or if a timer is timed out.

In 240, the device 201 receives information regarding allocated beacon resources of other devices. This information is used in 250 to monitor only relevant beacon resources. In some embodiments, the device only enables its receiver at time intervals where beacon signals are expected according to the received beacon configuration message.

It is noted that one or more of the actions described as optional in this example may be non-optional in other examples. Likewise, one or more of the actions described as non-optional in this example may be optional in other examples.

In this example, 135, 235, 245 are described as optional. They only apply to devices acting as masters.

As mentioned earlier, master devices transmit beacon signals and slave devices scan for beacons. It should be noted that a device may take the role of master only, slave only or a combination of both roles.

Depending on the situation (e.g. if a beacon is sent, radio conditions, etc.), a beacon may or may not be detected in 255. The detection process may comprise any suitable known of future algorithms. For example, the detection could comprise one or more of signal detection, energy detection, correlation to one or more known sequences, and decoding of a coded message. The discovery procedure 250, 255 may be terminated once one beacon signal or a subset of beacon signals have been discovered (each discovered beacon signal typically associated with a separate LDID and/or a separate device). It could also be terminated when a particular (predetermined or dynamic) time has elapsed, e.g. when a timer associated with the transmission pattern information or discovery session has timed out.

A beacon measurement report (or beacon detection report) 261 is transmitted by the device 201 in 260. It is received by the network node 101 in 160. This relates to the situation when the device is a beacon monitoring device (slave). The report may be transmitted at predetermined times/intervals (regardless of whether a beacon has been detected or not) and/or as a consequence of beacon detection in 255.

In some embodiments, a beacon measurement report 262 is transmitted by the network in 160 and received by the device in 260. This relates to the situation when the device is a beacon transmitting device (master).

Thus, the network node 101, may receive one or more beacon measurement reports in 160 and transmit (at least part of) the information therein to one or more devices as illustrated by 262. For example, information may be transmitted to each device regarding which other devices are prospects for D2D connection based on the information in the beacon measurement reports. The beacon measurement reports to and from the network node, 261 and 262 respectively, may have the same or different format.

The beacon measurement report 261 may comprise information relating to how many beacons (if any) have been detected and particulars of the detected beacons (e.g. one or more of beacon signature, corresponding LDID, a cell identity (i.e. an indication of which cell the beacon transmitting device belongs to), received power of the beacon, RSSI, RSRP, an interference estimate, signal-to-noise ratio (SNR), signal-to-interference ratio (SIR), signal-to-noise and interference ratio (SINR), estimated path loss and/or radio channel between the corresponding devices, etc.). Other particulars of detected signals may also be reported. For instance, the timing (e.g. within a cyclic prefix for an OFDM system) of the detected signal in relation to another timing (e.g. DL or UL timing for the connection to the network node) may be reported. The number of detection trials prior to actual detection may also be reported. Another example of report content may be an indication regarding at which time/frequency resource the beacon signal was detected.

The beacon measurement report 262 may comprise the same or similar information as the report 261. Additionally or alternatively, the beacon measurement report 262 to a particular device may comprise information (e.g. identities, radio condition estimation, etc.) regarding which devices have indicated that they have reliably detected the beacon of the particular device. Yet additionally or alternatively, the beacon measurement report 262 to a particular device may comprise information regarding which devices (if any) may cause interference to the particular device.

The beacon measurement report may be used by the network node to assist 165, 170, 175 in the setup of a connection between the device 201 and another particular device. For example, the network node may relay (at least part of) the information to the relevant devices to assist the device in setting up a D2D connection and/or to decide whether or not to set up a D2D connection at all.

In another example, the report may be used to determine in 165 whether to use cellular connection or D2D connection (or whether to set up a connection at all). A D2D connection may be chosen if the device 201 has detected the beacon of the particular device and a cellular connection may be chosen if the beacon of the particular device was not detected. Other conditions may also apply, for example, the radio propagation conditions on a prospective D2D link, radio propagation conditions on a link between the network node and the device 201 (and/or on a link between the network node and one or more other devices, e.g. another device of a prospect D2D communication), the current traffic load and/or capacity of the network node, etc. A D2D connection may, for example, be chosen if the current traffic load of the cell is high and/or if the respective links between the network and the devices of a prospect D2D communication have bad radio conditions while a prospect D2D link between the devices have good radio conditions. In the embodiments where beacons of neighboring cells are also included in the scanning process and in the reporting to network, such information may be used to determine whether or not to handover a device (or more generally, perform a cell switch for the device) to a neighboring cell (or request a handover from a neighboring cell) before initiating a D2D connection setup.

If a cellular connection is chosen, the network node sets it up in 175. If a D2D connection is chosen, the network node may assist in the setup in 170 and 270. For example, the network node may determine which type of D2D connection to use (unlicensed or licensed, protocol applicable, etc.), allocate resources for the D2D connection (e.g. spectrum, time, frequency), provide power control (e.g. set initial transmission power based on a received beacon signal power). This assistance may utilize signaling 271, 272 between the network node and the device 201 (and between the network node and the other particular device). For example, such signaling may render unnecessary sending an acknowledgement message directly from the device 201 to the particular device when its beacon has been detected.

When the D2D connection has been set up the two devices communicate directly with each other according to the D2D communication protocol in 275.

When in D2D communication (e.g. as described in 275 of FIG. 2), the path loss between some or all device-to-device pairs may thus be known to the network node and/or to one or more of the devices. For example, from 255 of FIG. 2, the measuring device may acquire knowledge of the path loss between the measured devices and itself, from 261 of FIG. 2, the network may be informed of all estimated path losses or may require information to estimate path losses for all performed measurements, and from 262 of FIG. 2 the device may be informed of estimated path losses for all or some of the other devices.

Turning again to the situation of the devices 60 and/or 70 of FIG. 1*a* (and correspondingly the devices 70 and/or 20 of FIG. 1*b*), embodiments will be described where one or more of the devices determines a criterion for the experienced interference and thereafter transmits an interference management request message to the network node based on the determined interference criterion.

In some embodiments, e.g. where device 60 and device 70 are not using the same frequency, the experienced interference may be so strong that, although device 60 and device 70 are not using the same frequency, problems are still encountered. That the devices are not using the same frequency could imply that they use different parts of the allocated channel, which is readily achieved in case the system is using Orthogonal Frequency Division Multiplexing (OFDM) by allocating different sub-carriers to different D2D links. It could also mean that device 60 and device 70 are using different channels, but because of too large power difference between interfering and desired signal, device 60 might still experience problems.

According to one embodiment, the four D2D capable devices (30, 60, 70, 80 of FIG. 1*a*) as well as the network node 40 have knowledge of which other D2D capable devices are within range. In particular, device 60 is aware of that device 70 might interfere and vice versa. In order for device 60 to ensure that the interference coming from device 70 will not significantly degrade the communication between device 60 and device 30, device 60 may determine what is the maximum transmit power which should be used by device 70 in order to not interfere with device 60, and make a request to the network node to ensure this limitation to be communicated to device 70.

As a first numerical example, suppose that device 60 wants the interference from device 70 to not exceed the level of the thermal noise in the receiver of device 60, which has been determined to be e.g. −107 dBm/MHz. Furthermore, suppose that it is known that the path loss between device 60 and device 70 is e.g. 90 dB. Then, device 60 may make a request to the network node that the transmission (TX) power of device 70 should be limited to −17 dBm/MHz. In case the available bandwidth is e.g. 20 MHz, this corresponds to that the total TX power should be limited to −17+13 dBm=−4 dBm. This example illustrates one embodiment where the interference criterion determination may be done autonomously by the device. The network node might request device 70 to actually do as requested by device 60, or upon negotiating with device 70 decide that device 70 cannot limit the output power as much as requested by device 60. In the latter case, device 60 may be informed and may take proper action.

In some situations, the device 60 does not really know how bad the interference from device 70 is. In this case, device 70 may send its beacon and device 60 may listen. Device 60 can then estimate the signal strength of the received signal from device 70 and determine if it is too strong and causes significant interference. If so, a request can be made to the network as described in the previous example. This example illustrates one embodiment where the interference criterion determination may be done after receiving test signal information (e.g. comprising beacon information of device 70) from the network node.

In some embodiments, the device 60 may determine how much the interference power from device 70 needs to be reduced in order to not degrade the performance for device 60. A request may then be made to the network node to accomplish this reduction in interference. The network node may carry on by, for example, forcing device 70 to use a lower TX power, allocating the device 60 to frequencies which are further away from those of device 70 (or vice versa as will be seen further on), or a combination of both. In this example, the amount of reduction is thus determined by the device 60. This ensures that the countermeasure taken is not unnecessary large.

An outcome of the request from device 60 to the network might be that it is not possible neither to reduce the TX power of device 70 nor to move device 70 to another frequency. An alternative counteraction from the network may then be to move device 60 in frequency or to allow a higher TX power for device 30 (which would also improve the interference situation at device 60). Another countermeasure might be that the data rate of the link between device 30 and device 60 is reduced. Then it would be more robust to interference.

Figure 4:
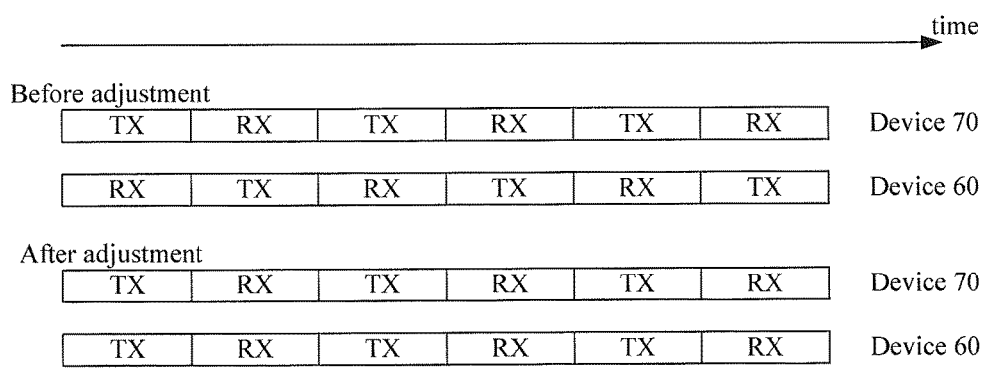
FIG. 4 is a schematic diagram illustrating an example transmission pattern adjustment according to some embodiments.

In some situations, the network node may be informed about the situation (e.g. that there is cumbersome interference) by device 60 (and possibly by device 70 as well) and may conclude that it is not possible to reduce the interference level by reducing the TX power or by moving one of the links to another frequency. In such (and other) situations, the interference management may be handled by proper aligning of frame structures of the two links (62 and 72). Specifically, suppose that device 60 has reported a problem with experiencing too high interference from device 70. The network might then request device 60 to shift the TX/RX pattern used with communication with device 30 such that interference from device 70 will not be a problem (preferably by ensuring that device 60 and device 70 transmit and receive at the same time, as illustrated in FIG. 4). Alternatively, the network might request device 70 to adjust its TX/RX timing such that the same effect is obtained.

Thus, FIG. 4 illustrates a time schedule for reception and transmission of device 60 and device 70 respectively. Before adjustment, the transmission/reception patterns of devices 60 and 70 are not aligned (i.e. device 60 transmits when device 70 receives and vice versa). After adjustment, the transmission/reception patterns of devices 60 and 70 are aligned (i.e. device 60 and 70 transmits at the same time and receive at the same time), whereby it is avoided that the transmissions of device 70 disturb the receptions of device 60 and vice versa.

In a situation where the different D2D links causing interference to one another do not need to be active all the time, the interference between the links might be managed by time sharing. Specifically, the network may allocate non-overlapping time-slots to the different D2D links. If (for example) OFDM is used, different time/frequency resources may be allocated to the different D2D links. To know if this is needed, or even sufficient, the network may preferably have as good knowledge as possible of the interference situation.

Thus, embodiments allow for effective interference management in D2D communications, which may ensure that the interference is kept at low enough levels without limiting the transmission possibilities more than necessary for the different D2D links. Embodiments provide for a spectrum efficient way to determine different D2D links in network assisted D2D communications.

In some embodiments, it is the network that initiates the procedures described above (e.g. by requesting device 60 and/or device 70 to take the actions described above), rather than device 60 initiating the procedure itself. In other embodiments, the device 60 initiates the procedure, either by determining the interference criterion autonomously as exemplified above or by requesting test signaling from device 70 via the network node as will be described in connection to FIG. 3*a*.

Figure 3A:
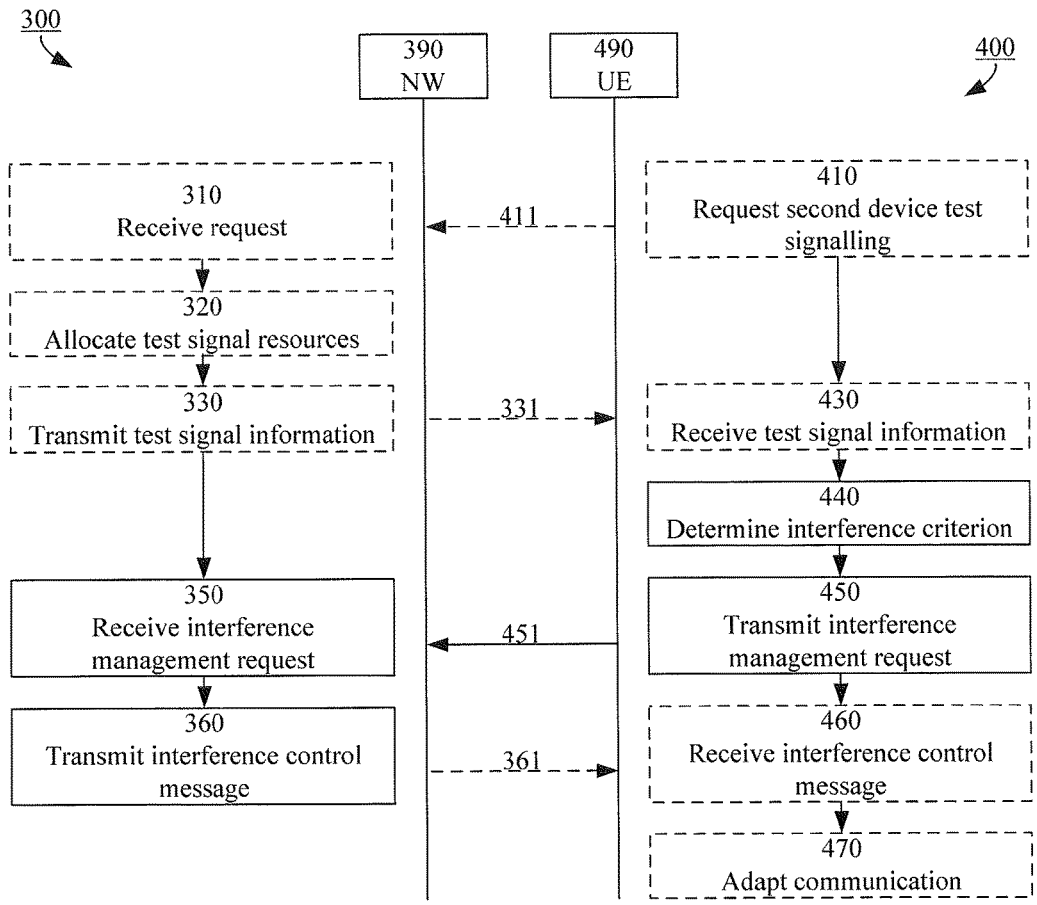
FIG. 3a is a combined flowchart and signaling diagram illustrating example methods and signaling according to some embodiments.

FIG. 3*a* is a combined flowchart and signaling diagram illustrating example methods performed by a network node (e.g. the network node 40 of FIG. 1*a*) and a D2D capable device (e.g. the device 60 of FIG. 1*a*) respectively and signaling between them according to some embodiments. A method 300 is performed by a network node 390 and a method 400 is performed by a device (user equipment—UE) 490.

Figure 3B:
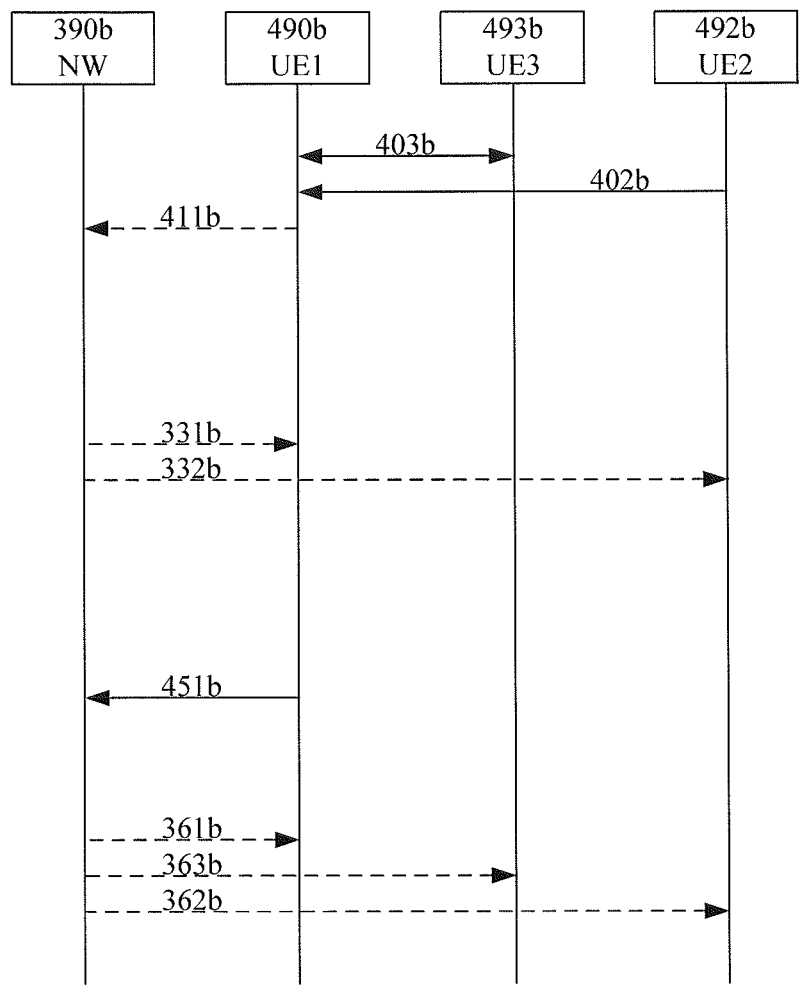
FIG. 3b is a signaling diagram illustrating example signaling according to some embodiments.

FIG. 3*b* is a related signaling diagram illustrating example signaling between a network node 390*b* (e.g. the network node 40 of FIG. 1*a*) and three D2D capable devices (UE1, UE2, UE3) 490*b*, 492*b* and 493*b* (e.g. the devices 60, 70 and 30 of FIG. 1*a*) respectively according to some embodiments. The network node 390*b* may correspond to the network node 390 of FIG. 3*a* and the device 490*b* may correspond to the device 490 of FIG. 3*a*. Some steps and signaling is marked as dashed in FIGS. 3*a* and 3*b*. This indicates that these are optional steps, at least for some embodiments.

A situation according to some embodiments will now be described with joint reference to FIGS. 3*a* and 3*b*. A first device 490, 490*b* is in D2D communication with a third device 493*b* as illustrated by 403*b*. A second device 492*b* causes interference to the first device 490, 490*b* as illustrated by 402*b*.

The method 400 comprises determining an interference situation and/or criterion in 440 and transmitting an interference management request message related to the interference criterion to the network node, as illustrated by 450 and 451, 451*b*.

The interference management request message 451, 451*b* is received by the network node in 350. After the reception in 350, the network transmits, 360, an interference control message to at least one of the first wireless communication device 361, 361*b*, a second wireless communication device (the interfering device) 362*b*, and a third wireless communication device (the device being in D2D communication with the first device) 363*b*. The interference control message(s) is received at the respective device and the device adjusts its communication accordingly.

The interference criterion may comprise any of the examples disclosed herein. For example, the interference criterion may comprise a power indication (maximum allowed interference reception power, maximum allowed interference transmission power, a differential power value indicating a desired interference power decrease) or simply an indication that interference from a particular device is not acceptable (i.e. the countermeasure decision is left to the network node).

Optionally, the method 400 comprises transmitting 410, to the network node, a request 411, 411*b* for second (interfering) device test signaling, and the method 300 comprises the network node receiving 310 the request. The network node may allocate test signal resources as illustrated in 320 (for example similar or equivalent to the resource allocation in 110 and 125 of FIG. 2), and transmit information regarding the allocation (second device test signaling information) to the interfered device 490, as illustrated by 330 and 331, 331*b*. The device 490 receives the information in 430. The network may also transmit a test signaling command to the second device as illustrated by 332*b*.

In some embodiments, the methods start at 320 (or 330) and 430 respectively, i.e. the interference measurement is initiated by the network node.

When the second device 492*b* transmits the test signal, the interfered device 490, 490*b* may use the test signal to determine the interference criterion and transmit the interference criterion (or an indication thereof) to the network node, for example when the interfered device has determined an interference situation associated with the second wireless communication device as illustrated in 440. Alternatively, the determination in 440 may be performed without test signaling (e.g. referring to an absolute received signal power level tolerated by the device 490, 490*b*). Thus, in some embodiments, the methods start at 350 and 440 respectively as exemplified above.

When the determination in 440 is done, the device transmits, to the network node, an interference management request message related to the interference criterion and/or situation, as illustrated by 450 and 451, 451*b*. The interference management request message is received by the network node in 350.

The network transmits, in 360, an interference control message to at least one of the first wireless communication device as illustrated by 361, 361*b*, the second wireless communication device (the interfering device) as illustrated by 362*b*, and the third wireless communication device (the device being in D2D communication with the first device) as illustrated by 363*b*.

If an interference control message is directed to the interfered device, it is received in 460, and the device adjusts its communication accordingly in 470.

If an interference control message is directed to the second or third device, some related information may be received by the interfered (first) device also 361, 361*b*, e.g. information regarding which change is being made at the other device.

The adjustment by at least one of the first, second and third device may comprise any of the examples disclosed herein. For example, the adjustment may comprise a power adjustment, a frequency adjustment, a time adjustment, or a data rate adjustment. Thus, the adjustment of communication of the first, second and/or third device may, for example, be according to any of the methods described herein. For example, the second device may be asked to lower its transmission power (by a differential value or to an absolute power level), to adjust its time and/or frequency transmission pattern, and/or to move to another carrier frequency. Alternatively or additionally, the first device may be asked to adjust its time and/or frequency transmission pattern, to adjust its data rate, and/or to move to another carrier frequency. Yet alternatively or additionally, the third device may be asked to increase its transmission power (by a differential value or to an absolute power level), to adjust its time and/or frequency transmission pattern, to adjust its data rate, and/or to move to another carrier frequency. Another example comprises when the communication on the link between the first and third devices is aligned (e.g. via time alignment, link sharing) with the communication by the second device.

When an adjustment is made, that may be reported to the network node, and possibly to the interfered device (e.g. via the network node).

It should be noted that the examples herein mainly refer to the situation when a single network node is involved in the network assisted device-to-device communication. It is noted that this network node may be any suitable network node, e.g. a base station or (e) NodeB, a network controller node, a relay node, etc. A network node may be in control of resources relating to one or several base stations. For example, a network controller may allocate resources to devices operating under different base stations.

In some embodiments, a first network node is in control of a first set of resources and a second network node is in control of a second set of resources. The first and second sets may coincide, may be overlapping or may be non-overlapping. The first network node may acquire information regarding allocated resources in the second network node. Such information may be shared with devices under control by the first network node. If a first device is under control by the first network node and a second device is under control by the second network node, a D2D connection may be assisted by one of the network nodes using the other network node as a relay when required, and/or by a network node controlling both the first and second network nodes.

Figures 5, 6:
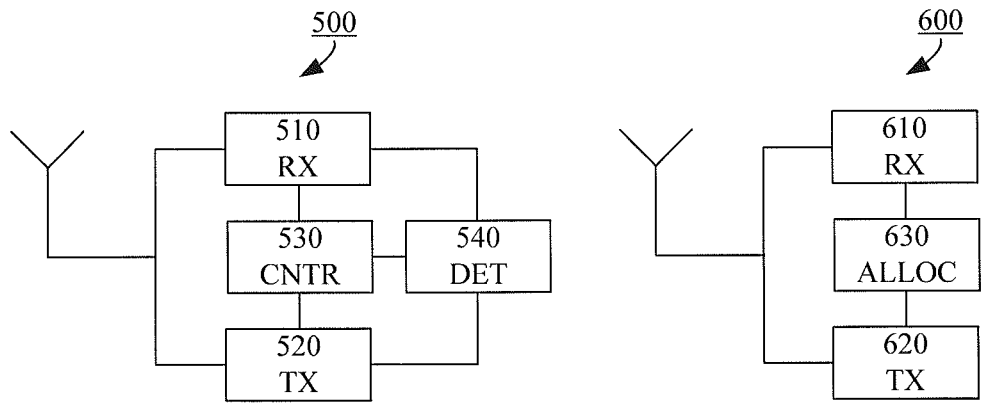
FIG. 5 is a block diagram illustrating an example arrangement according to some embodiments.
FIG. 6 is a block diagram illustrating an example arrangement according to some embodiments.

FIG. 5 is a block diagram illustrating an example arrangement 500 according to some embodiments. The example arrangement may be comprised in a wireless communication device (e.g. one of the devices of FIGS. 1a and 1b and/or the device 490, 490b of FIGS. 3a and 3b respectively).

The arrangement may comprise a receiver 510, a transmitter 520, a controller 530 (optionally) and an interference determiner 540, and may be adapted to perform e.g. the method 400 of FIG. 3a.

Thus, the interference determiner 540 may be adapted to determine an interference criterion associated with a second wireless communication device, and the transmitter 520 may be adapted to transmit an interference management request message related to the interference criterion to a network node.

The receiver 510 may be adapted to receive second device test signaling information from the network node. In such embodiments, the interference determiner may be adapted to determine the interference criterion based on the received second device test signaling.

In some embodiments, the transmitter may be further adapted to transmit a request for second device test signaling to the network node to initiate the interference control procedure.

The controller 530 may be adapted to cause the transmitter and/or received to perform the actions of the described methods, e.g. based on a determination by the determiner. The controller may also be adapted to control the determiner 540.

FIG. 6 is a block diagram illustrating an example arrangement 600 according to some embodiments. The example arrangement may be comprised in a network node (e.g. 40 of FIGS. 1a and 1b and/or 390, 390b of FIGS. 3a and 3b respectively).

The arrangement comprises a receiver 610, a transmitter 620, and an allocator 630, and may be adapted to perform e.g. the method 300 of FIG. 3a.

The receiver 610 may be adapted to receive an interference management request message related to an interference criterion from a first wireless communication device adapted to perform device-to-device communication and the transmitter 620 may be adapted to transmit an interference control message to at least one of the first wireless communication device, a second wireless communication device, and a third wireless communication device.

The allocator 630 may be adapted to allocate test signal resources to the second device.

In some embodiments, the receiver 610 may be further adapted to receive a request for a second device test signaling from the first device that initiates the interference control procedure.

The transmitter 620 may be further adapted to transmit second device test signaling information to the first device and a test signaling command to the second device, either to initiate the interference control procedure by the network node or as a response to reception of a request for a second device test signaling from the first device.

The arrangement may also comprise a controller (not shown), adapted to cause the allocator, the transmitter and/or the received to perform the actions of the described methods.

The described embodiments of the invention and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus (e.g. a wireless communication device) comprising circuitry/logic or performing methods according to any of the embodiments of the invention. The electronic apparatus may, for example, be a portable or handheld mobile radio communication equipment, a mobile radio terminal, a mobile telephone, a base station, a base station controller, a communicator, an electronic organizer, a smartphone, a computer, a printer, a notebook or a mobile gaming device.

Figure 7:
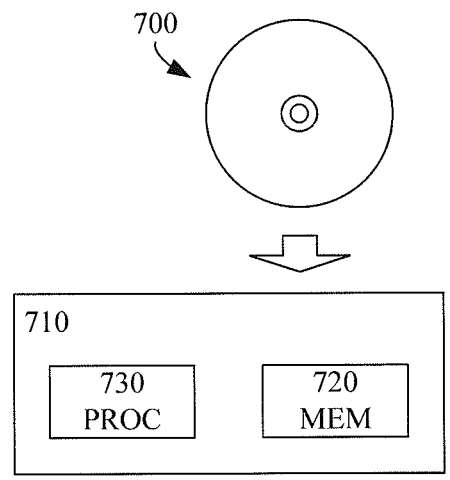
FIG. 7 is a schematic drawing illustrating a computer readable medium according to some embodiments.

According to some embodiments of the invention, a computer program product comprises a computer readable medium such as, for example, a diskette or a CD-ROM as illustrated by 700 of FIG. 7. The computer readable medium 700 may have stored thereon a computer program comprising program instructions. The computer program may be loadable into a data-processing unit 730, which may, for example, be comprised in a mobile terminal or network node 710. When loaded into the data-processing unit 730, the computer program may be stored in a memory 720 associated with or integral to the data-processing unit 730. According to some embodiments, the computer program may, when loaded into and run by the data-processing unit, cause the data-processing unit to execute method steps according to, for example, any of the methods shown in FIG. 3a.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting.

The invention claimed is:

1. A method of a first wireless communication device adapted to perform device-to-device communication, the method comprising:
   determining, while the first wireless communication device is involved in device-to-device communication with a third wireless communication device, a power interference criterion associated with a second wireless communication device which causes interference to the device-to-device communication, wherein the second wireless communication device is not involved in the device-to-device communication with the first wireless communication device or the third wireless communication device;
   transmitting, to a network node, an interference management request message related to the power interference criterion; and
   receiving, from the network node, information regarding an adjustment being made at the second wireless communication device, wherein the adjustment to the second wireless communication device is made based on the transmitted interference management request message.

2. The method of claim 1, further comprising:
   transmitting, to the network node, a request for second device test signaling;
   receiving, from the network node, second device test signaling information; and
   determining the power interference criterion based on a reception of the second device test signaling.

3. The method of claim 1 wherein the power interference criterion comprises one or more of:
   a maximum transmission power for the second wireless communication device;
   a maximum reception power of the first wireless communication device for reception of transmissions from the second wireless communication device; and
   a desired power adjustment.

4. The method of claim 1, further comprising receiving an interference control message from the network node.

5. The method of claim 4, wherein the interference control message comprises one or more of:
   instructions to adjust a transmission power of the first wireless communication device;
   instructions to adjust a transmission pattern of the first wireless communication device;
   instructions to adjust a transmission frequency of the first wireless communication device;
   instructions to adjust transmission resources of the first wireless communication device; and
   instructions to adjust a transmission data rate of the first wireless communication device.

6. The method of claim 1, wherein the adjustment comprises one or more of:
   an adjustment of a transmission power of the second wireless communication device;
   an adjustment of a transmission pattern of the second wireless communication device;
   an adjustment of a transmission frequency of the second wireless communication device;
   an adjustment of transmission resources of the second wireless communication device; and
   an adjustment of a transmission data rate of the second wireless communication device.

7. A method of a network node adapted to provide assistance to device-to-device communication comprising:
   receiving, from a first wireless communication device adapted to perform device-to-device communication and involved in device-to-device communication with a third wireless communication device, an interference management request message related to a power interference criterion associated with a second wireless communication device which causes interference to the device-to-device communication, wherein the second wireless communication device is not involved in the device-to-device communication with the first wireless communication device or the third wireless communication device;
   transmitting an interference control message to at least the second wireless communication device; and
   transmitting, to the first wireless communication device, information regarding an adjustment being made at the second wireless communication device, wherein the adjustment to the second wireless communication device is made based on the received interference management request message.

8. The method of claim 7, further comprising:
   receiving, from the first wireless communication device, a request for a second device test signaling;
   allocating test signaling resources to the second wireless communication device;
   transmitting, to the first wireless communication device, second device test signaling information; and
   transmitting a test signaling command to the second wireless communication device.

9. The method of claim 7, wherein the interference control message to at least the second wireless communication device comprises one or more of:
   instructions to adjust a transmission power of the second wireless communication device;
   instructions to adjust a transmission pattern of the second wireless communication device;
   instructions to adjust a transmission frequency of the second wireless communication device;
   instructions to adjust transmission resources of the second wireless communication device; and
   instructions to adjust a transmission data rate of the second wireless communication device.

10. A non-transitory computer readable storage medium having thereon a computer program comprising program instructions, the computer program being loadable into a data-processing unit and adapted to cause execution of a method of a first wireless communication device adapted to perform device-to-device communication, when the computer program is run by the data-processing unit, wherein the method comprises:
   determining, while the first wireless communication device is involved in device-to-device communication with a third wireless communication device, a power interference criterion associated with a second wireless communication device which causes interference to the device-to-device communication, wherein the second wireless communication device is not involved in the device-to-device communication with the first wireless communication device or the third wireless communication device;

transmitting, to a network node, an interference management request message related to the power interference criterion; and receiving, from the network node, information regarding an adjustment being made at the second wireless communication device, wherein the adjustment to the second wireless communication device is made based on the transmitted interference management request message.

11. An arrangement of a first wireless communication device adapted to perform device-to-device communication, the arrangement comprising:

an interference determiner adapted to determine, while the first wireless communication device is involved in device-to-device communication with a third wireless communication device, a power interference criterion associated with a second wireless communication device which causes interference to the device-to-device communication, wherein the second wireless communication device is not involved in the device-to-device communication with the first wireless communication device or the third wireless communication device;

a transmitter adapted to transmit an interference management request message related to the power interference criterion to a network node; and a receiver adapted to receive, from the network node, information regarding an adjustment being made at the second wireless communication device, wherein the adjustment to the second wireless communication device is made based on the transmitted interference management request message.

12. The arrangement of claim 11 wherein the transmitter is further adapted to transmit a request for second device test signaling to the network node, wherein the receiver is further adapted to receive second device test signaling information from the network node, and wherein the interference determiner is adapted to determine the power interference criterion based on a reception of the second device test signaling.

13. An arrangement of a network node adapted to provide assistance to device-to-device communication comprising:

a receiver adapted to receive, from a first wireless communication device adapted to perform device-to-device communication and involved in device-to-device communication with a third wireless communication device, an interference management request message related to a power interference criterion associated with a second wireless communication device which causes interference to the device-to-device communication, wherein the second wireless communication device is not involved in the device-to-device communication with the first wireless communication device or the third wireless communication device; and a transmitter adapted to transmit an interference control message to at least a second wireless communication device, and to transmit, to the first wireless communication device, information regarding an adjustment being made at the second wireless communication device, wherein the adjustment to the second wireless communication device is made based on the received interference management request message.

14. The arrangement of claim 13, further comprising an allocator adapted to allocate test signal resources to the second wireless communication device.

15. The arrangement of claim 13, wherein the receiver is further adapted to receive a request for a second device test signaling from the first wireless communication device, and wherein the transmitter is further adapted to transmit second device test signaling information to the first wireless communication device and a test signaling command to the second wireless communication device.

* * * * *